United States Patent
Eventoff et al.

(10) Patent No.: US 12,313,478 B2
(45) Date of Patent: May 27, 2025

(54) LOW DRIFT FORCE SENSOR WITH CAPACITIVE CAPABILITY

(71) Applicant: Sensitronics, LLC, Bow, WA (US)

(72) Inventors: Franklin N. Eventoff, Bow, WA (US); James Aaron Holmes, Anacortes, WA (US); Christopher Ray Wittmier, Everett, WA (US)

(73) Assignee: Sensitronics, LLC, Bow, WA (US)

( * ) Notice: Subject to any disclaimer, the term of this patent is extended or adjusted under 35 U.S.C. 154(b) by 243 days.

(21) Appl. No.: 17/956,616

(22) Filed: Sep. 29, 2022

(65) Prior Publication Data

US 2023/0105781 A1    Apr. 6, 2023

Related U.S. Application Data

(60) Provisional application No. 63/251,569, filed on Oct. 1, 2021.

(51) Int. Cl.
*G01L 1/14* (2006.01)
*G01L 1/26* (2006.01)

(52) U.S. Cl.
CPC ................... *G01L 1/142* (2013.01)

(58) Field of Classification Search
CPC .. G06F 3/03547; G06F 3/0443; G06F 3/0354; G01L 1/16; G01L 1/22; G01L 1/144; H01L 23/48; G01N 27/413; G01N 27/27; G01N 3/08; G01N 27/49; G01R 19/145; H01M 10/4285
See application file for complete search history.

(56) References Cited

U.S. PATENT DOCUMENTS

| | | |
|---|---|---|
| 9,411,458 B2 | 8/2016 | Worfolk et al. |
| 10,352,788 B2 | 7/2019 | Eventoff et al. |
| 2006/0211217 A1 | 9/2006 | Xu et al. |
| 2013/0137663 A1 | 7/2013 | Messner et al. |
| 2014/0083207 A1* | 3/2014 | Eventoff ............... G01L 1/2287 73/862.68 |
| 2017/0184462 A1 | 6/2017 | Eventoff |
| 2019/0013286 A1* | 1/2019 | Murayama ............. H01L 24/13 |

* cited by examiner

*Primary Examiner* — Brandi N Hopkins
(74) *Attorney, Agent, or Firm* — Kolitch Romano Dascenzo Gates LLC

(57) ABSTRACT

Low drift force sensing conductors include small conductive balls in the ink used to create the conductor. The use of conductive balls reduces sensor drift while avoiding unwanted side-effects like temperature sensitivity. The conductive balls are made of sized synthetic graphite, a derivative of petroleum pitch or coal tar or any other suitable substance. Force sensors incorporating these balls also demonstrate enhanced sensitivity to low forces.

18 Claims, 6 Drawing Sheets

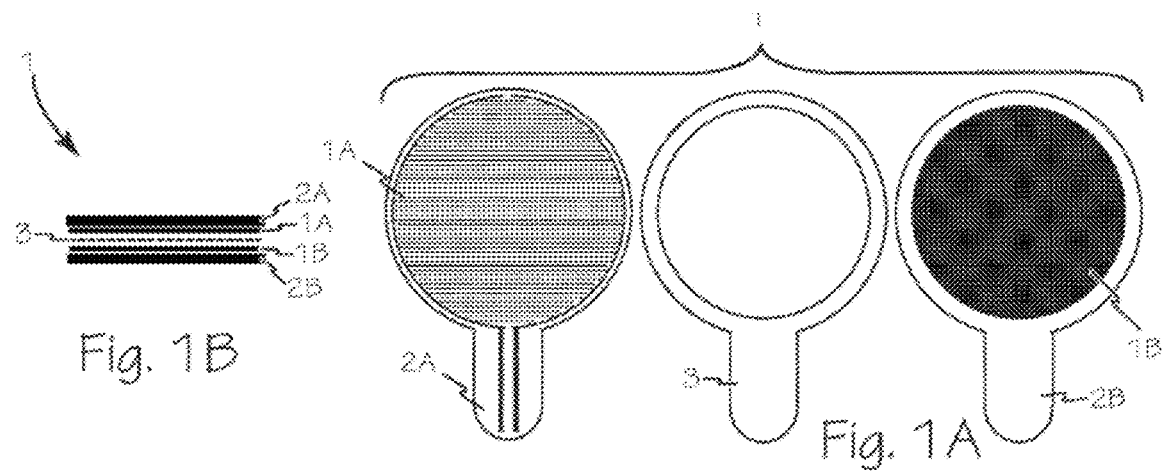
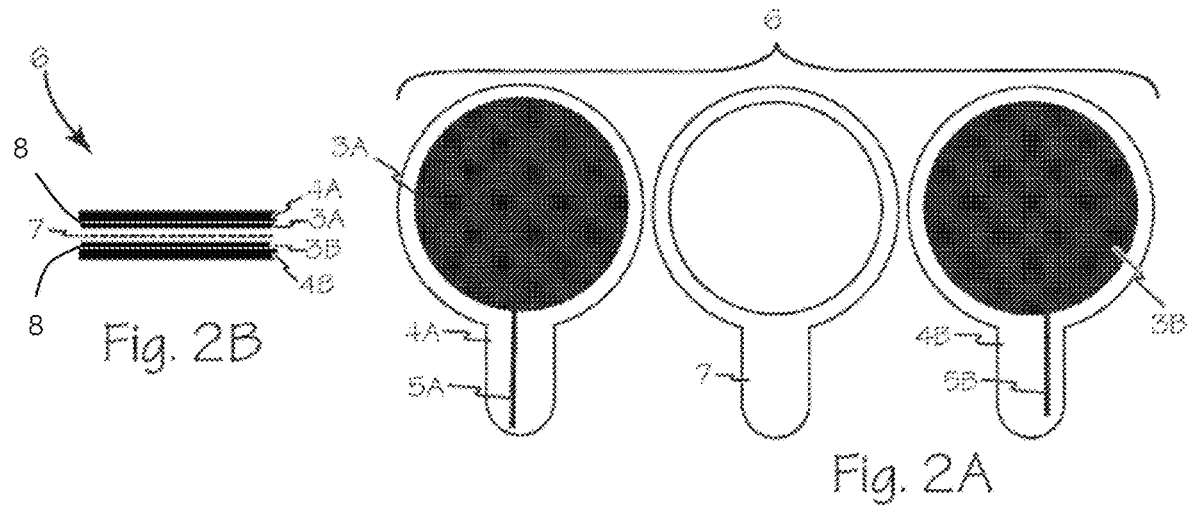

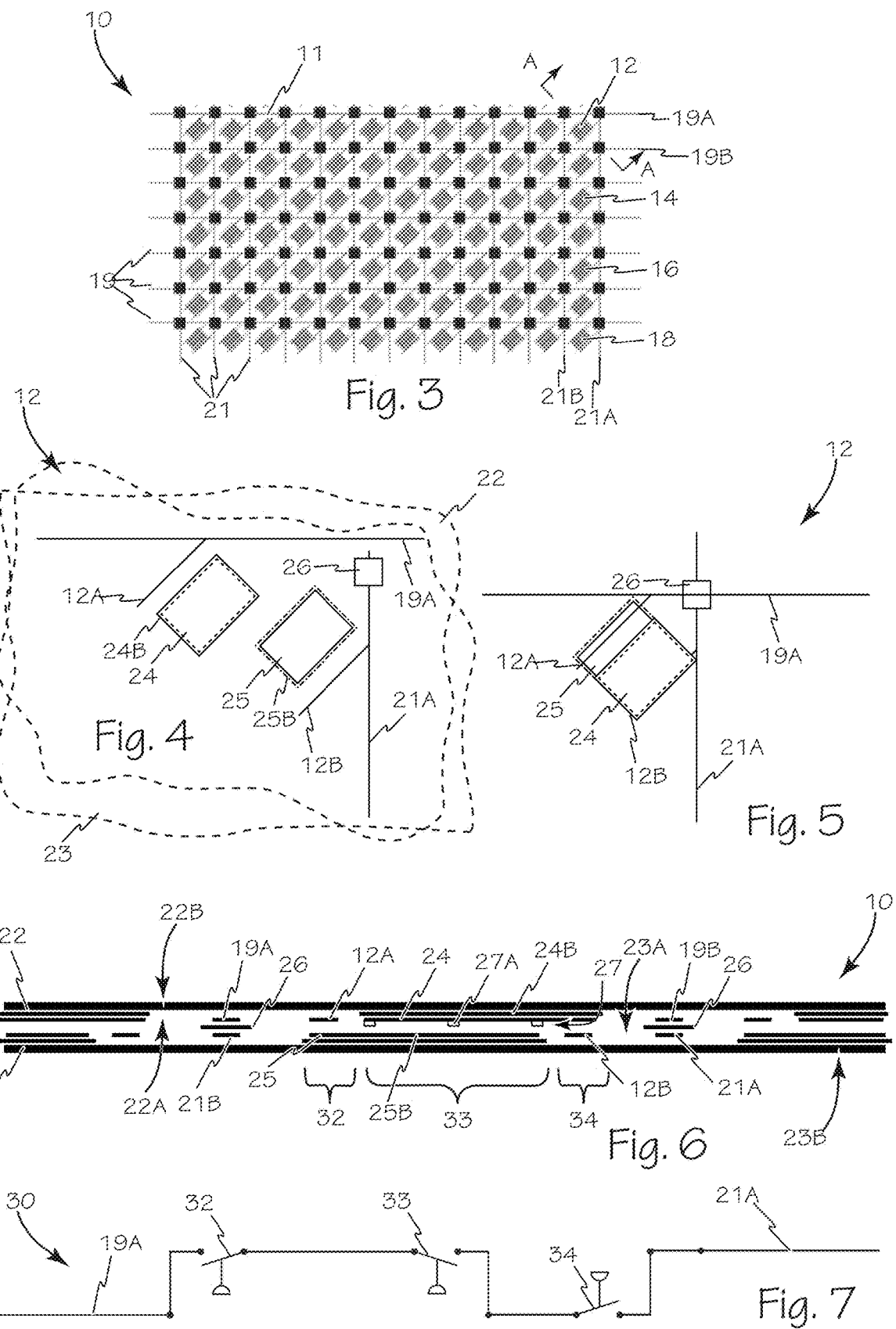

LOW DRIFT FORCE SENSOR WITH CAPACITIVE CAPABILITY

RELATED APPLICATIONS

This application claims priority from U.S. Provisional Patent Application 63/251,569 filed Oct. 1, 2021.

FIELD OF THE INVENTIONS

The inventions described below relate to the field of force sensors and more specifically to the field of force sensors that resist drift.

BACKGROUND OF THE INVENTIONS

Modern interface controls are integrating electronic touch sensors to detect inputs. Conventional sensor surfaces based on force sensing conductors generally suffer from relative insensitivity to the application of very light input force or the removal of very light input force due to the materials used and the density of material necessary to achieve a functional sensor. Different sensors are currently being employed to prevent retail theft and many of the sensor configurations provide ambiguous signals or are too slow to be effective in theft prevention.

Force sensing conductors also drift or becomes more conductive over time while under a fixed/dead weight or force. A specification of "5% per log time" is fairly common industry wide. This indicates a 5% increase in conductance after 10 seconds, another 5% increase after 100 seconds, another 5% after 1,000 seconds, and so on. The increase is logarithmic. It has been observed that lighter weights applied to the sensors produce more drift (a higher percentage per logarithmic interval), while heavier weights applied to the sensors produce less drift.

SUMMARY

The method and apparatus for low-drift, force sensors with capacitive capability or low drift force sensitive input devices disclosed below are formed as a membrane assembly that is capable of detecting capacitive presence near the sensor surface as well as pressure inputs and quantifying varying applications of pressure to the sensor surface. A low-drift hybrid capacitive force sensing membrane assembly formed with conductive ink or other suitable material incorporating conductive balls has reduced drift.

The conductive balls are made of synthetic graphite that is sifted for size. In most cases, suitable conductive balls are between 10 and 80 µm. The current best practice uses balls between 32 and 38 µm. The selected ball size is a function of the thickness of the deposited conductive material such as ink. The preferred ink thickness is about 10 µm. Thus, the ball size is generally 3 times the thickness of the conductive material or ink. In most cases the amount of conductive balls used is a function of the weight of the ink or other conductive material. Generally, 20% or less, by weight, of the ink or conductive material is composed of the conductive balls. The current best practice limits the conductive balls to less than 2% of the weight of the ink or conductive material and optimally the ink contains between 0.25 and 0.3% conductive balls by weight. The synthetic graphite is a derivative of petroleum pitch or coal tar, however any other suitable substance may be used. If another suitable substance is used and it differs in weight from the synthetic graphite described, the percentages of the conductive balls to conductive material will need to be different to achieve comparable results.

The balls are conductive and generally spherical and they may be irregularly shaped. Initial tests show that a prescribed loading by weight reduces drift as much as 90% and greater relative to typical sensors without balls in the conductive ink. Force sensors incorporating these balls also demonstrate enhanced sensitivity to low forces.

A low-drift force sensors with capacitive capability are formed of two substrates coated with oriented patches, areas or traces of conductive ink incorporating conductive balls on apposing surfaces of the parallel substrates. As a capacitive sensor, the electrical charge of a user's hand, finger or other extremity is sensed by the conductive layers of the sensor as a function of the input extremity's location and proximity to the sensor surface. As a force sensor, a user's input contact with the sensor surface is detectable when conductive elements on apposing substrates are forced into contact as the input force is applied. Increasing the applied force increases the area of contact between the substrates increasing conductance of the contacting patches.

Pre-loading the force sensor elements results in controlled amount of force between the two substrates causing a constant state of pre-load and eliminating the low-end or minimal pressure signal noise associated with unloaded sensors. Pre-loading the force sensing conductor sensors also enables the sensor to detect removal of low intensity pressure input such as might occur during theft of light weight articles placed in contact with the pre-loaded force sensor. Using a force sensor will enable any handling of protected retail packaging to be detected and identified. A library of conductive signals representing different "touches" can be established that will yield cutting, ripping, twisting, etc. making the detection of a theft in progress more accurate.

A force sensing smart-peg may be used to support and display merchandise and identify theft when it is in progress. A force sensor Smart-Peg combines a force sensing conductor element printed on the merchandise packaging that may or may not be coated with plastic. The packaging is stamped to form a curved leaf-spring which is oriented to maintain pre-loaded contact with electrodes of the Smart-Peg as the merchandise is displayed hanging from the Smart-Peg. This pre-loaded state will allow extra time for photographing any person lifting or moving the packaging to assist in identifying thefts in progress because as the product is lifted the sensor will remain in contact with the electrodes.

Force sensor pre-load options include a fixed weight, adhesive, vacuum or differentially embossed upper and lower substrates causing a pre-load between the substrates. Another alternative for pre-loading force sensor sensors is the use of a magnet or magnets on one or both substrates to control the intensity of the pre-load force. When used to generate a pre-load a magnetic field will allow a wide range of options.

Combining capacitive capability with low-drift force sensors provides an enhanced sensor with a z-axis depth of field sensitivity permitting gesture sensing with capacitance reacting to the approaching finger activator, then the force sensor responds to applied force of the finger and capacitive sensing again responds as the activating finger is withdrawn from the sensor surface.

A small area of contact between apposing patches and their conductive traces is made when an actuator (the device that touched the sensor surface) such as a human finger makes initial contact with the sensor. As force is increased the area of contact increases bringing more particles into play and thus increasing the conductivity of the device.

A trampoline sensor as described below provides a hybrid force sensing membrane which is secured along its perimeter over on opening sized and shaped to correspond to the size and shape of the force sensing membrane. A user applying force input to the sensor membrane does not encounter a hard surface beneath the sensor membrane. Instead, the sensor membrane operates like a trampoline providing an increased travel when a force is applied with no hard feel at the end of the sensor travel. A trampoline sensor may also include hybrid capacitive input sensing as described below.

BRIEF DESCRIPTION OF THE DRAWINGS

FIG. 1A is an exploded view of the components of a shunt mode force sensor.

FIG. 1B is a side view of the assembled shunt mode force sensor of FIG. 1A.

FIG. 2A is an exploded view of the components of a thru mode force sensor.

FIG. 2B is a side view of the assembled thru mode force sensor of FIG. 2A.

FIG. 3 is a schematic of a portion of a force sensor array.

FIG. 4 is an exploded block diagram of the elements of a force sensing element of the force sensor array of FIG. 3.

FIG. 5 is an oriented layout diagram of the elements of FIG. 4.

FIG. 6 is a cross section diagram of the force sensor assembly including the force sensing array of FIG. 3 taken along A-A.

FIG. 7 is a schematic circuit diagram of a force sensing assembly.

DETAILED DESCRIPTION OF THE INVENTIONS

Figure 8:
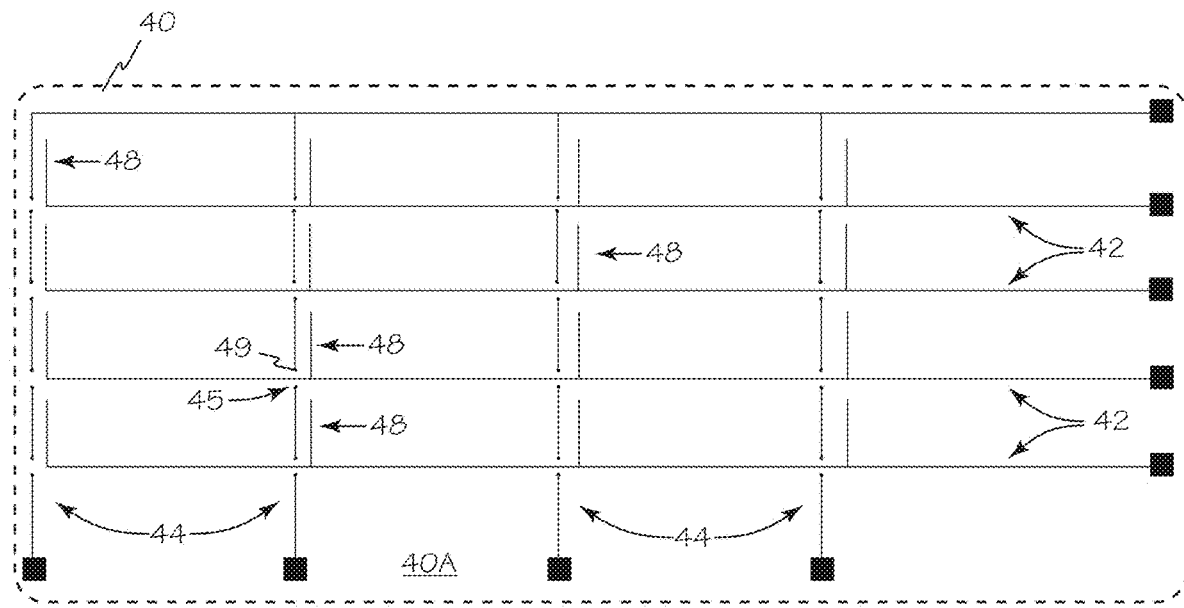
FIG. 8 is a layout diagram of a portion of a single layer conductive trace arrangement.

Force sensors generally comprise conductive surfaces on two substrates in apposition, facing one another, with an air gap between them. The gap ensures minimal or no contact between these conductive surfaces when the sensor is unloaded, and hence zero conductance and a very high (or infinite) electrical resistance. There are several variations of force sensor construction: ShuntMode, ThruMode, and Hybrid. Each of these has distinct advantages and disadvantages in terms of both performance and cost. Each configuration of the low-drift force sensors are constructed using a conductive ink or other conductive material with any suitable pigment such as carbon, graphene, graphite, or other materials such as molybdenum disulfide and any suitably sized conductive balls.

A low-drift pressure responsive, variable conductance, analog sensor has first and second conductors interleaved in spaced-apart relationship and disposed on a base member. A basic ShuntMode sensor 1 is illustrated in FIGS. 1A and 1B and is constructed by screen printing, etching copper traces of a printed circuit board, atomized aluminum, or by some other means a conductive interdigitating finger pattern, conductors 1A, on a first side of first substrate 2A, and screen printing, dip-coating, slot die, spraying or depositing by some other means the low-drift force sensing element material 1B on a first side of second substrate 2B, and apposing the two prepared surfaces on the substrates, the first sides of each respective substrate, towards each other to form a low-drift force sensing conductor device 1. An optional spacer 3 may be disposed between the apposing conductors 1A and material 1B to maintain an air gap between the conductive layers until suitable force is applied to the sensor. The width and spacing of the conductors influence the conductance range and low-end force sensitivity of the sensor. Conductors 1A and 1B include a plurality of conductive balls between 32 and 38 μm and they compose between 0.25%-0.3% the weight of the conductive material.

The ShuntMode variation of force sensing conductors is a cost-effective force-sensing solution when forces will be applied over a known area, when the connections need to be on a single substrate, or in other situations where the ShuntMode's unique sensitivity to the area of contact is acceptable or desirable. The ShuntMode variation is further suggested when it is desirable or required that the termination be on a single substrate (this is also a characteristic of Hybrid). One substrate of a ShuntMode sensor is arrayed with interdigitated conductors, typically of silver, copper or atomized aluminum while the other substrate is printed with a conductive force sensor ink. The width and spacing of the conductors influence the conductance range and low-end force sensitivity of the sensor.

In the case of the ThruMode force sensor 6 illustrated in FIGS. 2A and 2B, first substrate 4A and second substrate 4B are prepared by screen printing, etching conductive traces on a printed circuit board using any suitable atomized metal such as copper, silver, gold or aluminum. Or, by some other means forming a solid conductive pattern on each surface such as traces 5A and 5B and then over-coating one or both of the conductive patterns of each substrate with the force sensor element material 3A and 3B respectively. It is typical, but not mandatory, that one of the two substrates is made of a flexible material such as PET (Mylar), and is the upper, exposed, or top layer of the two that make up and force sensor device. An optional spacer 7 may be disposed between the apposing substrates 4A and 4B to maintain an air gap between the conductive layers until suitable force is applied to the sensor. Force sensor element material 3A and 3B includes a plurality of conductive balls between 32 and 38 µm and they compose between 0.25%-0.3% the weight of the conductive material.

The ThruMode variation of force sensing conductors is a more representative force sensor, producing conductance that is independent of the area over which the force is applied. Both substrates of the typical ThruMode sensor have a highly conductive layer (usually atomized silver, atomized copper or atomized aluminum) over which is printed a conductive force sensor layer. Most ThruMode sensors are terminated on both substrates, though additional design features such as folds or the use of conductive adhesives can sometimes be used to resolve all electrical connections to a single substrate.

There are variations or hybrids of the ShuntMode and ThruMode basic fundamental configurations. The Hybrid force sensing conductor is so named because it possesses construction and performance characteristics of both Shunt-Mode and ThruMode. In terms of construction, the Hybrid is most similar to ShuntMode, but adds a layer of conductive material (usually carbon, silver or other suitable atomized metal such as aluminum) beneath the force sensor layer. This additional conductive layer is not brought out to the termination, and thus, like a ShuntMode, a Hybrid force sensor is terminated on one substrate. In terms of performance, the Hybrid is similar to the ThruMode, most notably in that the area over which an applied force is spread does not influence the conductance.

Another force sensing conductor is a combined force sensor/capacitance sensor. In this sensor the capacitance senses the approach of an object and then the force sensor senses the force applied. In this configuration the capacitance is used as a reference to calibrate the force sensor drift when a steady load is applied to minimize the effect of drift over time. The capacitance of force sensing conductors has been shown to drift inversely, relative to conductance (increasing capacitance vs. time, as opposed to decreasing conductance vs. time). force sensor capacitance might be multiplied, by calibrated or generalized coefficients, and subtracted from conductance-derived values to calculate an output force value with improved drift immunity. For this purpose, force sensor capacitance could be measured using various traditional methods, i.e. integration, setting oscillator frequency, etc. Alternatively, in applications where cost or sampling time constraints make such methods impractical, a course approximation of capacitance might be derived from rise time measurements, sampled during the same step impulse typically used to drive conductance measurements. A further-simplified implementation might use force sensor capacitance in a qualitative sense to simply identify windows of time where drift rate is either acceptable or unacceptable and retain or discard conductance samples accordingly.

A force sensor formed as either ShuntMode, ThruMode, or Hybrid is formed of layers of any suitable conductive material such as ink or atomized metal that include conductive balls. For example, conductors 1A and 1B of FIGS. 1A and 1B and force sensor element material 3A and 3B of FIGS. 2A and 2B include a plurality of conductive balls 8 between 32 and 38 –m and they compose between 0.25%-0.3% the weight of the conductive material. The conductive balls are made of synthetic graphite that is sifted for size. In most cases, suitable conductive balls are between 10 and 80 µm in diameter. The current best practice uses balls between 32 and 38 µm. The selected ball size is a function of the thickness of the deposited conductive material such as ink. The preferred ink thickness is about 10 µm. Thus, the ball size is generally 3 times the thickness of the conductive material or ink. In most cases the amount of conductive balls used is a function of the weight of the ink or other conductive material. Generally, 20% or less, by weight, of the ink or conductive material is composed of the conductive balls. The current best practice limits the conductive balls to less than 2% of the weight of the ink or conductive material and optimally the ink contains between 0.25 and 0.3% conductive balls by weight. The synthetic graphite is a derivative of petroleum pitch or coal tar, however any other suitable substance may be used. If another suitable substance is used and it differs in weight from the synthetic graphite described, the percentages of the conductive balls to conductive material will need to be different to achieve comparable results.

The balls are conductive and generally spherical and they may be irregularly shaped. Initial tests show that a prescribed loading by weight reduces drift as much as 90% and greater relative to typical sensors without balls in the conductive ink. Force sensors incorporating these balls also demonstrate enhanced sensitivity to low forces.

A force sensor element printed on a substrate can be embossed with tiny peaks and valleys by using an etched metal surface with a "nail-file" pattern. The force sensor side of a printed substrate may be backed by and faces a piece of rubber, which is pressed against the rubber by the metal nail-file pattern as it rolls through two rollers, causing peaks and valleys on the substrate. The higher the peaks and deeper valleys the more resistive the force sensor.

Referring now to FIG. 3, force sensing assembly 10 includes force sensor array 11 which is formed from one or more force sensing conductor assemblies such as force sensor assemblies 12, 14, 16 and 18. Each force sensor assembly is oriented between parallel rows of conductor traces on each substrate such as first traces 19 and second traces 21. force sensor performance may be improved by including a highly conductive pad or patch between the substrate and each force sensor patch.

A force sensing assembly may be formed using two parallel substrates such as first substrate 22 and second substrate 23 as illustrated in FIGS. 4, 5 and 6. First substrate 22 has parallel conductive traces 19 printed along with a conductive leg such as leg 12A for each force sensor assembly such as force sensor assembly 12. Second substrate 23 has parallel conductive traces 21 printed along with a conductive leg such as leg 12B for each force sensor assembly such as force sensor assembly 12. When first substrate 22 and second substrate 23 are properly aligned with the deposited traces and patches in apposition, first conductive traces 19 are oriented perpendicular to second perpendicular traces 21. Near each conductive leg on each substrate, a force sensor patch such as patch 24 and patch 25 are deposited. Insulating elements or pads such as insulator pads 26 are deposited on either substrate over the conductive traces at the points where the corresponding conductive trace on the other substrate would be in contact when the substrates are aligned in apposition as illustrated in FIGS. 3 and 4. Insulating elements 26 separate the first conductors from the second conductors. Optional, highly conductive patches may be deposited between each force sensor patch and the substrate that supports it. For example, highly conductive patches 24B and 25B may be deposited between force sensor patches 24 and 25 and substrates 22 and 23 respectively.

Figure 9:
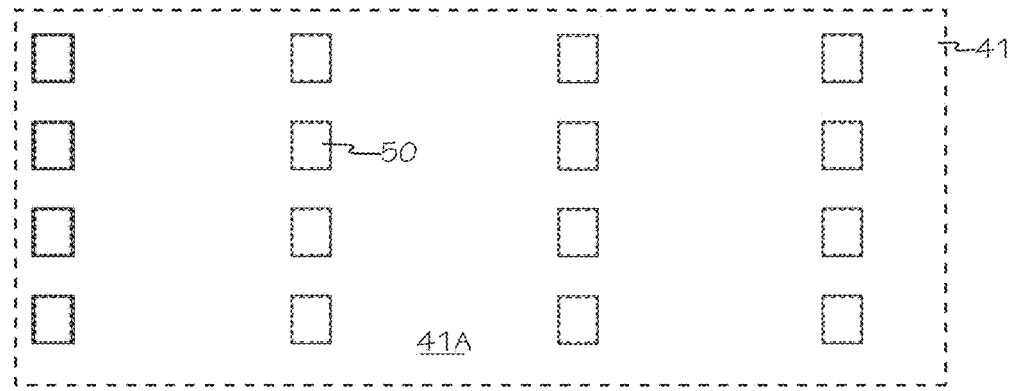
FIG. 9 is a layout diagram of conductive force sensor patches for use with the conductive trace arrangement of FIG. 8.

Controlling the dynamic range, the measured conductance of a force sensor circuit as a function of applied force on the sensor, is possible by controlling the size and texture of the conductive patches or electrodes as well as the spacing between the electrodes on the sensor substrates as well as the pre-load holding the substrates in contact without user input force. For example, using the atomized metal deposition method to form the electrodes or patches, such as patches 24 and 25 of FIG. 4 or conductors 44 and 48 of FIG. 9, a second layer, layer 27, of small dots or dashes 27A or other shapes over the base conductor electrode may be applied in an effort to emulate the texture of a thick-film silver and force sensor deposition. A thick-film force sensor has a better dynamic range when used in conjunction with a thick-film silver electrode with few small conductive peaks or spots as opposed to using a "flat" copper trace. Having too many spots or peaks causes the electrode to behave similar to a smooth flat conductor. In addition, pre-loading or compressing the substrates into a normal state of contact such as illustrated in FIGS. 15B and 1. This contact state, or pre-load state may form the lower threshold for switch or sensor closure thus eliminating low contact noise and inconsistencies between sensors. Pre-loading a force sensor also reduces the dynamic range of the sensor.

Referring now to FIG. 4, first substrate 22 has first conductive traces such as traces 19A and 19B, conductive leg 12A and first force sensor patch 24 deposited on a first surface such as conductor surface 22A. Second substrate 23 has second conductive traces such as traces 21A and 21B, conductive leg 12B and second force sensor patch 25 deposited on a first surface such as conductor surface 23A. Each substrate has a corresponding second surface such as second surfaces 22B and 23B respectively. When two printed substrates are aligned in parallel, the first surfaces of each substrate are aligned in apposition with the parallel traces on each substrate oriented perpendicular to the conductive traces of the apposing substrate yielding a force sensing assembly such as force sensing assembly 10 with the second surfaces of each substrate operating as a contact surface for the application of force to be detected and measured.

In use, pressure on the second surfaces 22B or 23B of either first or second substrate at or near a force sensor assembly such as force sensor assembly 12 will create a force sensitive circuit such as circuit 30 of FIG. 7 that extends from first conductive trace 19A to second conductive trace 21A through the three conductive elements covered with conductive adhesive as described below. First conductive element 32 covered with conductive adhesive patch is formed by the interaction of a portion of second force sensor patch 25 with conductive leg 12A. Second conductive element 33 is formed by the interaction of a portion of first force sensor patch 24 with second force sensor patch 25. Third conductive element 34 is formed by the interaction of a portion of first force sensor patch 24 with conductive adhesive patch 12B. The conductance value of each conductive element is proportional to the pressure applied to the substrate and the location of the pressure.

Referring now to FIGS. 8, 9, 10 and 11, an array of force sensor assemblies may be formed using two parallel substrates, such as substrates 40 and 41. First substrate 40 has rows and columns of conductive traces such as row traces 42 and column traces 44 formed on first side 40A of the substrate. Where the column traces intersect the row traces, such as intersection point 45, the column traces are interrupted by forming an electrical connection through the substrate from first side 40A to second side 40B and crossing the row trace with a jumper trace such as jumper trace 47 and then again forming an electrical connection such a connection 49 from second side 40B of the substrate to first side 40A of the substrate and reconnecting with interrupted column trace 44.

Electrical connection 49 may be formed using any suitable technique. A useful technique for forming electrical connection 49 when the majority of conductors are deposited using printing methods is accomplished by adjusting the viscosity of the conductive liquid being deposited to permit the conductive liquid to flow in and through a hole, such as hole 46 formed between first side 40A to second side 40B.

Alternatively, a dielectric or insulating pad can be printed over the row traces allowing an uninterrupted column trace to be deposited perpendicular to the row traces over the dielectric or insulating pads with a top coat of a suitable conductor such as silver. Parallel to the column traces are short conductor leg traces. On the first side of the second substrate are deposited force sensor elements such as patches of conductive material such as carbon nanotubes. When the substrates are oriented parallel with the first sides in apposition, the patches of the conductive material align over a column trace and a short leg trace such that pressure on the membrane causes one or more conductive patches to engage a column trace and a short leg trace forming a force sensitive conductance circuit.

Figure 10:
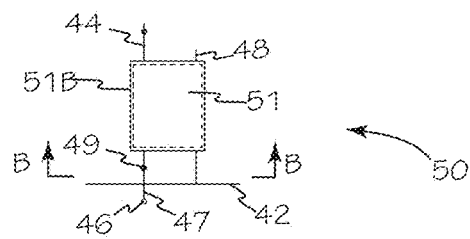
FIG. 10 is a top view of a single force sensor conductive patch and its corresponding traces.
Figure 11:
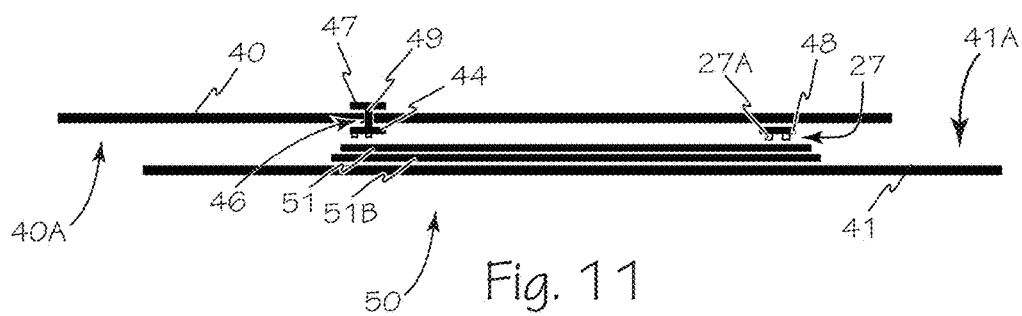
FIG. 11 is a cross-section view of the force sensor of FIG. 10.
Figure 12:
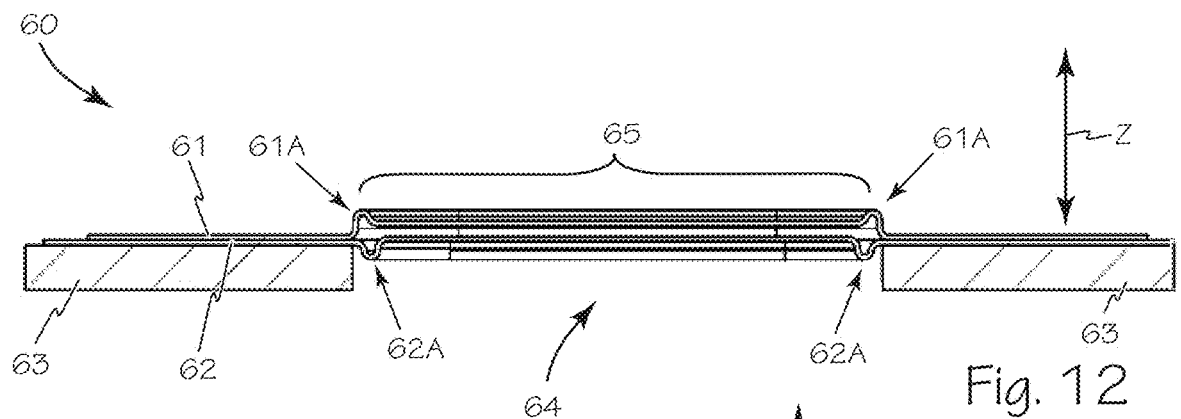
FIG. 12 is a cross-section view of a trampoline force sensor.
Figure 13:
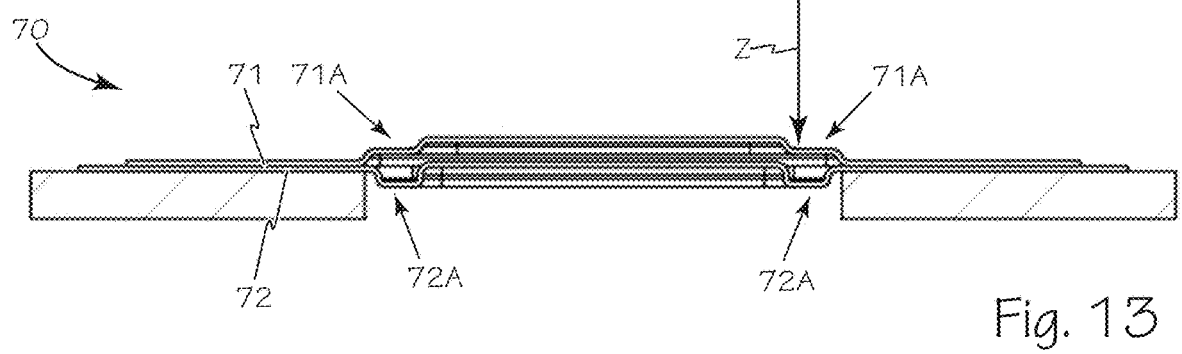
FIG. 13 is a cross-section view of an alternate trampoline force sensor.

Parallel to the column traces are short conductor leg traces such as leg traces 48. An array of force sensing assemblies such as force sensing assembly 50 is formed with an array of patches such as conductive patch 51 are deposited on first side 41A of second substrate 41. Highly conductive backing patches such as patches 51B may first be deposited on substrate 41 and force sensor conductive patches such as patch 51 may be deposited on the highly conductive backing patch to improve force sensor performance. force sensor elements or patches such as conductive patch 51 include conductive material such as CNT or PEDOT. When substrates 40 and 41 are oriented parallel with first sides 40A and 41A in apposition, the conductive patches such as patch 51 align over an interrupted column trace and a short leg trace as illustrated in FIGS. 10 and 11 to form force sensing assemblies such as force sensing assembly 50. In use, pressure on the membrane causes one or more conductive patches to engage a column trace and a short leg trace forming a force sensitive conductance circuit as discussed above.

Alternatively, substrate 41 may not have a plurality of conductive or semi-conductive patches such as patches 51, instead having a single flood layer of conductive or semi-conductive material deposited on substrate 41 with the conductive area apposing parallel conductors forming a force sensing assembly.

Force sensing membranes as discussed, and pre-loaded force sensing membranes may also benefit from a trampoline configuration such as illustrated in FIGS. 12, 13, 15A, 15B and 16. Force sensor 60 is formed with two parallel substrates such as first and second substrates 61 and 62 as discussed above. Each substrate may be planar or may be shaped to form a flexible section such as sections 61A and 62A respectively to optimize sensor movement along the z-axis. Each substrate containing one or more force sensor elements such as conductive deposits and or traces to form a force sensing conductor to quantify the location and intensity of force applied to the active area of the sensor. Sensor support 63 includes openings such as opening 64 sized and dimensioned to correspond to active area 65 of force sensor 60.

Force sensor 60 may be formed with the force sensing elements on each substrate oriented to provide one or more different active areas corresponding to each force sensing element. Multiple openings in sensor support 63 are formed with each opening collocated with a force sensing element.

Force sensor 70 is formed with two parallel substrates such as first and second substrates 71 and 72 as discussed above. Each substrate is shaped to form a flexible section such as sections 71A and 72A respectively to allow sensor movement along the z-axis. Each substrate containing one or more force sensor elements such as conductive deposits and or traces to form a force sensing conductor when force is applied to the active area of the sensor.

Figure 14:
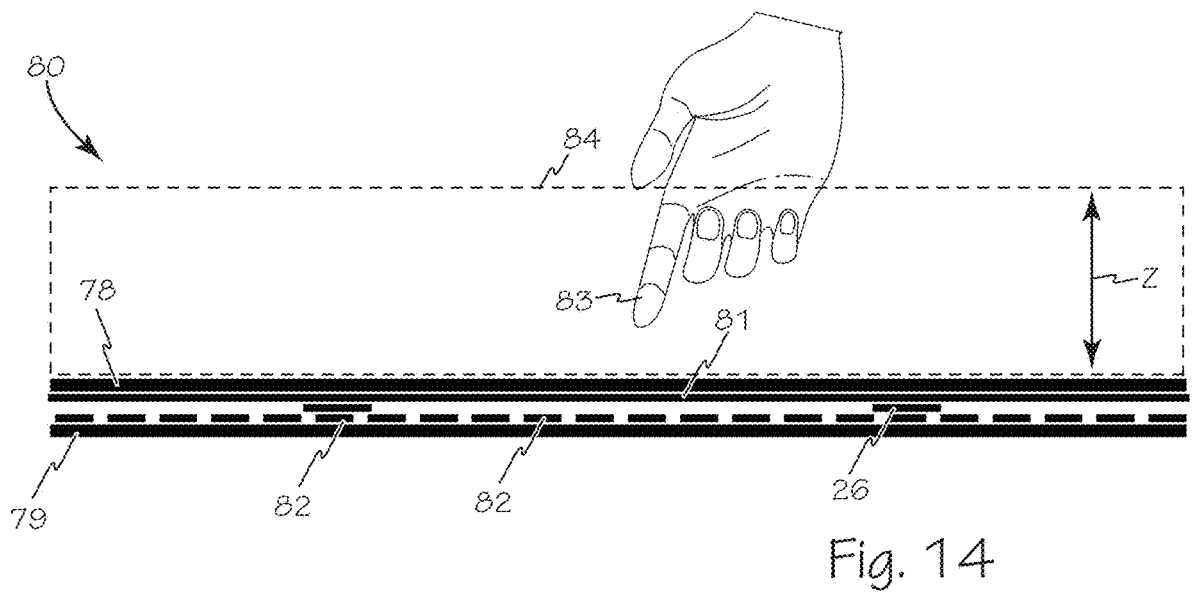
FIG. 14 is a cross-section view of a capacitive force sensor.

Referring now to FIG. 14, First conductive layer 78 and second conductive layer 79 of force sensing conductor 80 may also be used as elements of a capacitive sensor to sense the presence and location of a user's stylus, hand, finger or other conductive apparatus or appendage along the z-axis. Conductive area 81 is deposited on first conductive layer 78 and conductive traces 82 are deposited on second conductive layer 79 to form a force sensing conductor. A voltage applied across the conductive layers creates a capacitive sensor reactive to a conductive appendage such as finger 83 in sensor space 84.

Figure 15A:
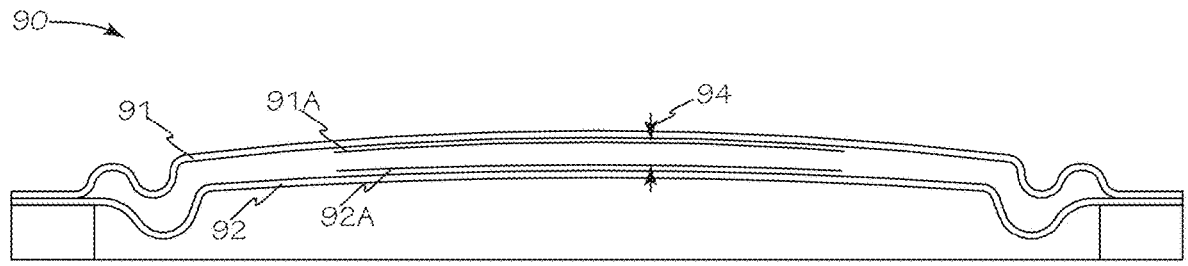
FIG. 15A is a cross-section view of a force sensor sensor before pre-load.
Figure 15B:
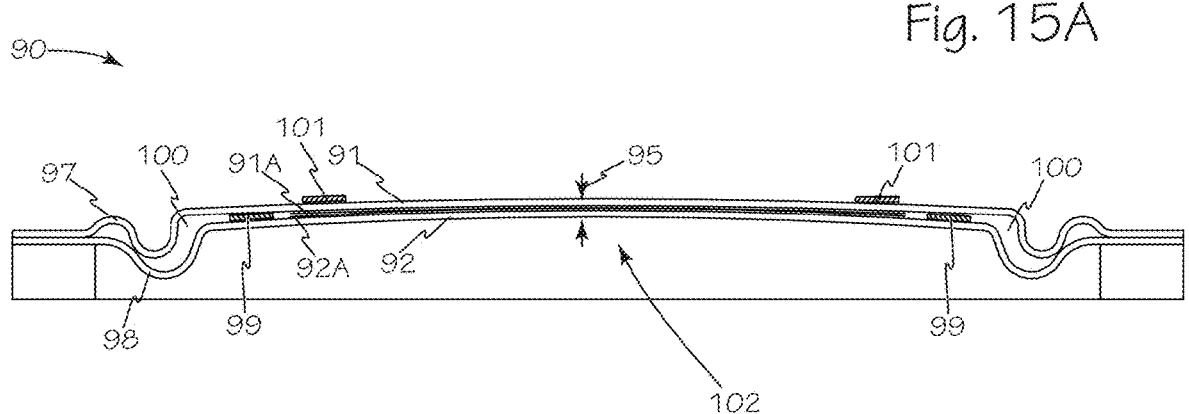
FIG. 15B is a cross-section view of a force sensor sensor after pre-load.

Referring now to FIGS. 15A and 15B, sensor 90 is a force sensing conductor as described above and includes substrates 91 and 92 with conductive contacts 91A and 92A deposited thereon respectively and optional highly conductive backing contacts as well. Generally, substrates 91 and 92 are oriented with conductive contacts 91A and 92A in apposition with some separation 94 between the conductive contacts as shown. Pre-loading of the substrates as illustrated in FIG. 15B brings conductive contacts 91A and 92A into a pre-determined level of contact which is determined by pre-load force 95. In this configuration, pre-load force 95 is controlled by first and second embossed edges 97 and 98 respectively.

Alternatively, pre-load force 95 between first substrate 91 and second substrate 92 may be generated by an adhesive layer 99 between the substrates, or by drawing a vacuum in space 100, or by installing a fixed weight or weights 101 on first substrate 91 to use gravity to urge the substrates into pre-load position 102. These configurations for achieving force sensor pre-load are fixed during manufacture and present little opportunity to change or adjust the intensity of the pre-load force during use.

Figure 16:
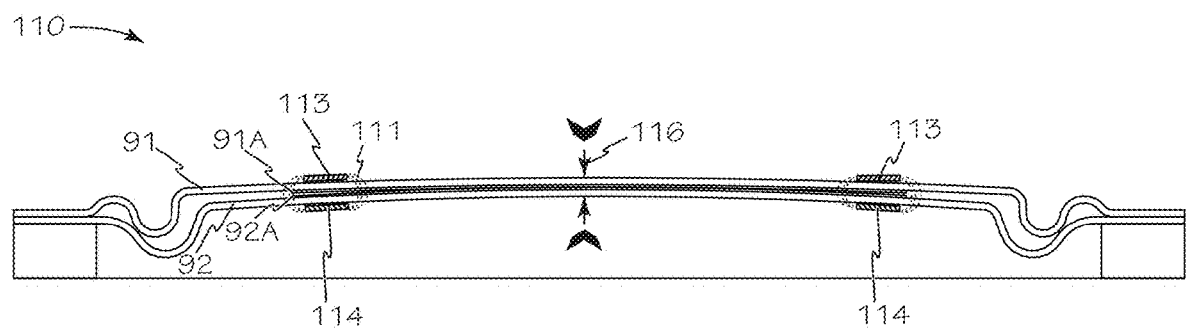
FIG. 16 is a cross-section view of a force sensor sensor with external pre-load applied.

Referring now to FIG. 16 force sensor 110 is pre-loaded using magnetic field 111 between first or upper magnet 113 and any suitably oriented ferrous material such as second or lower magnet 114. The size of the magnets and the strength of field 111 permits control of pre-load force 116. Magnets 113 and 114 may be fixed magnets for providing a fixed pre-load, alternatively, either or both of the magnets may be electro magnets enabling controllable variation in pre-load force 116. If the electro-magnet may also be configured to create a repulsive force to set a negative pre-load of offset that must be overcome to engage the force sensor. Similarly, either first magnet 113 or second magnet 114 may be replaced by suitable ferrous material to interact with the remaining magnet or electro-magnet.

In some force sensor configurations, the conductive electrodes deposited on the substrates may be made magnetic to achieve a pre-load between the substrates. Alternatively, the ink used for the force sensor conductive patches may be made magnetic to create the pre-load.

Pre-loaded force sensor sensors may be incorporated into or on merchandise packaging to assist in minimizing theft. Referring now to FIGS. 17A, 17B, 18 and 19, pre-loaded force sensor 120 is incorporated into merchandise packaging 121. Merchandise may be displayed and supported by pegs, rods, hooks or other devices such as peg 122 which is supported on a merchandise display rack such as rack 123. Peg 122 includes one or more conductive elements such as electrodes 124 and 126 which are connected to any suitable merchandise security system such as system 125. Merchandise packaging 121 is cut and shaped to form a tab such as tab 127 which functions as a leaf spring which provides elastic support for packaging 121 and any attached merchandise. Tab 127 is configured to enable the weight of packaging 121 and the attached merchandise to preload the force sensor. Tab 127 has a first side 127A and a second side 127B. Second side 127B serves as a substrate for a low drift conductive force sensor patch 128 which may be formed and deposited with conductive balls incorporated into the conductive material or ink as discussed above.

Figure 17B:
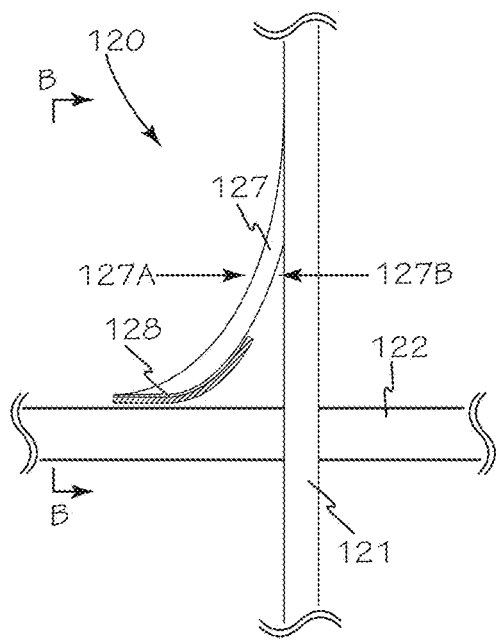
FIG. 17B is a close-up view of the pre-loaded force sensor sensor of FIG. 17A taken along A-A.
Figure 17A:
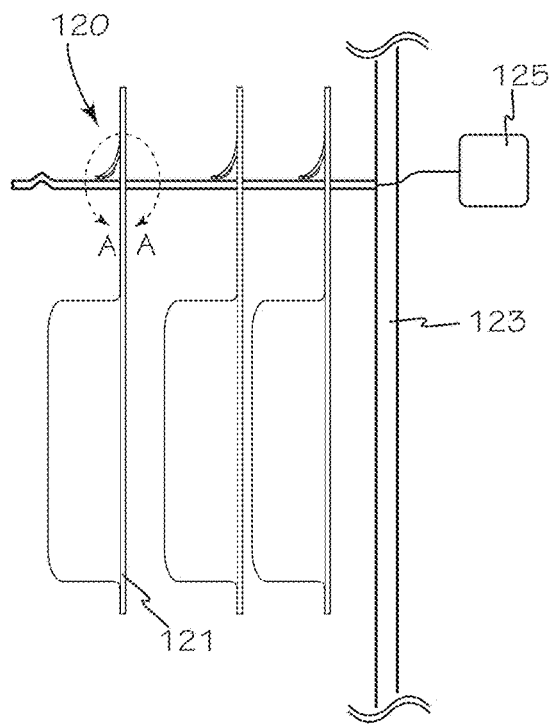
FIG. 17A is a side view of a conductive peg and cooperating force sensor packaging.
Figure 18:
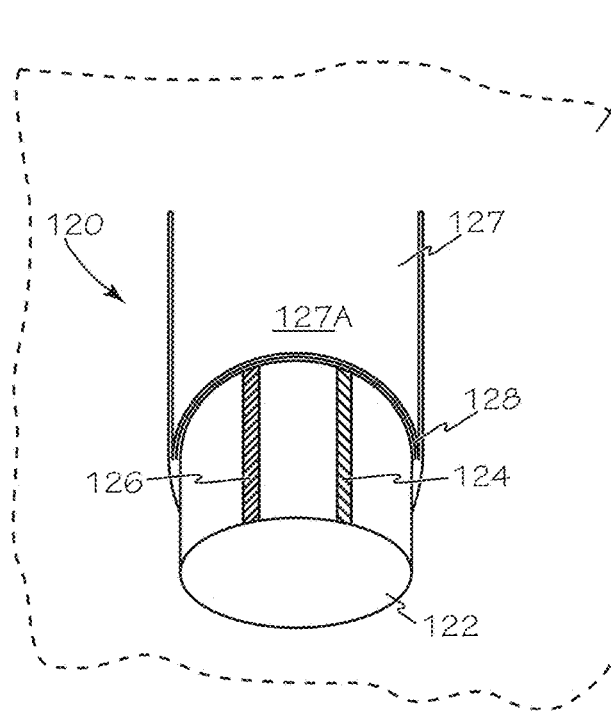
FIG. 18 is a front perspective of the conductive peg and force sensor of FIG. 17B.
Figure 19:
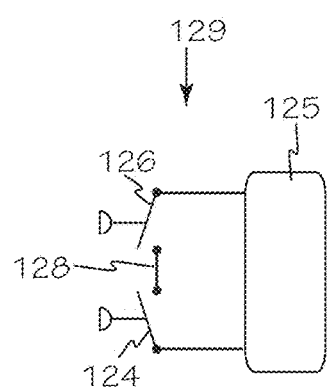
FIG. 19 is a schematic diagram of the circuit formed using the apparatus of FIG. 17A.

When merchandise packaging is displayed as illustrated in FIG. 17A, circuit 129 of FIG. 17 formed by force sensor patch 128 and electrodes 124 and 126 is pre-loaded by the spring action of tab 127. The pre-load enables circuit 129 to react to a change in the conductance of the circuit caused by movement of packaging 121 which may or may not be caused by a legitimate purchaser.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A force sensing assembly comprising:
   a generally planar first substrate having a conductor surface and an opposing touch surface;
   a plurality of parallel conductive traces on the conductor surface of the first substrate;
   a first array of conductive patches oriented between adjacent parallel conductive traces and each patch is electrically connected to the conductive traces on a conductive surface of the first substrate, each conductive patch of the first array of conductive patches is formed as a layer, wherein the layer is comprised of conductive material and a plurality of conductive balls between 10 and 80 μm in size;
   a generally planar second substrate having a conductor surface and an opposing touch surface;
   a plurality of parallel conductive traces on a conductive surface of the second substrate;
   a second array of conductive patches oriented between adjacent parallel conductive traces and each patch is electrically connected to the conductive traces on the conductive surface of the second substrate, each conductive patch of the second array of conductive patches is formed of conductive material including a plurality of conductive balls;
   wherein the first substrate and the second substrate are oriented parallel to each other with the conductive surfaces of each substrate in apposition and the plurality of parallel conductive traces on the first substrate oriented perpendicular to the plurality of conductive traces on the second substrate; and
   a plurality of insulating pads secured on the conductive traces on the first substrate where the perpendicular traces of the second substrate intersect the traces of the first substrate.

2. The hybrid force sensor of claim 1 wherein the arrays of conductive patches are formed of at least two layers.

3. The force sensing assembly of claim 2 wherein the conductive material is ink and the plurality of conductive balls are less than 2% of the weight of the ink.

4. The force sensing assembly of claim 2 wherein the conductive material is ink and the plurality of conductive balls are less than 1% of the weight of the ink.

5. The force sensing assembly of claim 2 wherein the conductive material is ink and the plurality of conductive balls are between 0.25% and 0.3% of the weight of the ink.

6. The force sensing assembly of claim 2 wherein one of the at least two layers of each conductive patch is highly conductive and oriented between the other of the at least two layers of the conductive patch and the substrate.

7. The force sensing assembly of claim 1 wherein the plurality of conductive balls are less than 2% of the weight of the conductive material.

8. The force sensing assembly of claim 1 wherein the plurality of conductive balls are less than 1% of the weight of the conductive material.

9. The force sensing assembly of claim 1 wherein the plurality of conductive balls are between 0.25% and 0.3% of the weight of the conductive material.

10. A force sensing assembly comprising:
a generally planar first substrate having a conductor surface and an opposing touch surface;
a plurality of parallel conductive traces on the conductor surface of the first substrate;
a first array of conductive patches oriented between adjacent parallel conductive traces and each patch is electrically connected to the conductive traces on the conductive surface of the first substrate, each conductive patch of the first array of conductive patches is formed of conductive material including a plurality of conductive balls between 10 and 80 μm in size;
a generally planar second substrate having a conductor surface and an opposing touch surface;
a plurality of parallel conductive traces on the conductive surface of the second substrate;
a second array of conductive patches oriented between adjacent parallel conductive traces and each patch is electrically connected to the conductive traces on the conductive surface of the second substrate, each conductive patch of the second array of conductive patches is formed of conductive material including a plurality of conductive balls;
wherein the first substrate and the second substrate are oriented parallel to each other with the conductive surfaces of each substrate in apposition and the plurality of parallel conductive traces on the first substrate oriented perpendicular to the plurality of conductive traces on the second substrate; and
a plurality of insulating pads secured on the conductive traces on the first substrate where the perpendicular traces of the second substrate intersect the traces of the first substrate,
wherein the conductive material is ink and the plurality of conductive balls are less than 2% of the weight of the ink.

11. The force sensing assembly of claim 1 wherein the conductive material is ink and the plurality of conductive balls are less than 1% of the weight of the ink.

12. The force sensing assembly of claim 1 wherein the conductive material is ink and the plurality of conductive balls are between 0.25% and 0.3% of the weight of the ink.

13. The force sensing assembly of claim 1, wherein the conductive material is ink, and wherein the plurality of conductive balls have a diameter that is greater than a thickness of the layer.

14. The force sensing assembly of claim 1, wherein the force sensing assembly comprising the layer having the plurality of conductive balls has a lower drift in conductivity relative to another force sensing assembly having a layer that does not include conductive balls.

15. A force sensing assembly comprising:
two generally planar, flexible substrates oriented parallel to each other; and
a conductive patch and one or more conductors deposited on each substrate, between the two substrates forming a force sensor in an active area of the substrates wherein the conductive patch is formed as a layer, wherein the layer is comprised of conductive material and a plurality of conductive balls between 10 and 80 μm in size.

16. The force sensing assembly of claim 15 wherein each conductive patch is ink with conductive balls and the conductive balls are less than 2% of the weight of the conductive material.

17. The force sensing assembly of claim 15 wherein each conductive patch is ink with conductive balls and the conductive balls are less than 1% of the weight of the conductive material.

18. The force sensing assembly of claim 15 wherein each conductive patch is ink with the conductive balls and the conductive balls are between 0.25% and 0.3% of the weight of the conductive material.

\* \* \* \* \*